(12) United States Patent
Kim

(10) Patent No.: US 9,795,183 B2
(45) Date of Patent: Oct. 24, 2017

(54) SLIPPER OR SANDAL CAPABLE OF BEING WORN BI-DIRECTIONALLY

(71) Applicant: Yong Soo Kim, Changwon-si (KR)

(72) Inventor: Yong Soo Kim, Changwon-si (KR)

( * ) Notice: Subject to any disclaimer, the term of this patent is extended or adjusted under 35 U.S.C. 154(b) by 20 days.

(21) Appl. No.: 15/099,728

(22) Filed: Apr. 15, 2016

(65) Prior Publication Data

US 2016/0316850 A1    Nov. 3, 2016

(30) Foreign Application Priority Data

Apr. 29, 2015    (KR) .................... 10-2015-0060582

(51) Int. Cl.
| | |
|---|---|
| *A43B 3/12* | (2006.01) |
| *A43B 3/24* | (2006.01) |
| *A43B 13/20* | (2006.01) |
| *F16K 5/04* | (2006.01) |
| *F16K 15/04* | (2006.01) |
| *F16K 15/18* | (2006.01) |
| *A43B 3/10* | (2006.01) |
| *F16K 1/14* | (2006.01) |

(52) U.S. Cl.
CPC ............... *A43B 3/24* (2013.01); *A43B 3/103* (2013.01); *A43B 3/108* (2013.01); *A43B 3/12* (2013.01); *A43B 3/128* (2013.01); *A43B 13/20* (2013.01); *A43B 13/203* (2013.01); *F16K 1/14* (2013.01); *F16K 5/0407* (2013.01); *F16K 15/04* (2013.01); *F16K 15/183* (2013.01)

(58) Field of Classification Search
CPC ........... A43B 3/12; A43B 3/126; A43B 3/128; A43B 13/20; A43B 13/203

USPC ............................................. 36/11.5, 29, 100
See application file for complete search history.

(56) References Cited

U.S. PATENT DOCUMENTS

| | | | |
|---|---|---|---|
| 3,991,491 A | | 11/1976 | Huang |
| 4,106,222 A | * | 8/1978 | Houck .................. A43B 3/108 36/11.5 |

(Continued)

FOREIGN PATENT DOCUMENTS

KR    10-2005-0122149 A    12/2005

OTHER PUBLICATIONS

European Search Report dated Jan. 31, 2017 in connection with the counterpart European Patent Application No. 16165197.1.

*Primary Examiner* — Marie Bays
(74) *Attorney, Agent, or Firm* — Hauptman Ham, LLP

(57) ABSTRACT

A shoe in form of a slipper or sandal, includes a body 100 adapted to have a first fluid casing 12 and a second fluid casing 14, each having an elastic property, embedded in the front and rear portions of the body, respectively, and an instep strap 120 supported to the body in such a way as to be rotated in a specific section. A rotating shaft 16 is rotated in conjunction with the instep strap, and it includes a first connecting portion connected to the first fluid casing and a second connecting portion connected to the second fluid casing and an internal passage having respective check ball seating portions formed on the inside of the first and the second connecting portions, and with check ball received in the internal passage. When the rotating shaft is inclined by rotation of the rotating shaft, the check ball closely adheres to any one of the check ball seating portions by gravity or buoyancy and regulates a fluid flow to any one of the first and the second connecting portions.

2 Claims, 3 Drawing Sheets

(56) References Cited

U.S. PATENT DOCUMENTS

| | | | | |
|---|---|---|---|---|
| 4,446,634 | A | * | 5/1984 | Johnson ............... A43B 13/203 36/28 |
| 4,753,022 | A | * | 6/1988 | Gasbarro ............... A43B 13/20 36/11.5 |
| 4,829,682 | A | * | 5/1989 | Gasbarro ............... A43B 13/20 36/11.5 |
| 5,706,589 | A | * | 1/1998 | Marc ...................... A43B 13/18 36/27 |
| 6,505,420 | B1 | * | 1/2003 | Litchfield ............ A43B 13/203 36/28 |
| 7,823,299 | B1 | * | 11/2010 | Brigham ................ A43B 3/105 36/100 |
| 2003/0217484 | A1 | * | 11/2003 | Christensen ......... A43B 13/203 36/29 |
| 2005/0132606 | A1 | * | 6/2005 | Passke ................... A43B 7/081 36/3 B |
| 2006/0000112 | A1 | * | 1/2006 | Chien .................... A43B 3/105 36/11.5 |
| 2007/0294916 | A1 | | 12/2007 | Park |
| 2011/0277344 | A1 | | 11/2011 | Berg |
| 2012/0042537 | A1 | * | 2/2012 | Dimatteo ............... A43B 3/128 36/11.5 |

\* cited by examiner

SLIPPER OR SANDAL CAPABLE OF BEING WORN BI-DIRECTIONALLY

REFERENCE TO RELATED APPLICATIONS

This application claims the priority benefit of Korean Patent Application No. 10-2015-0060582 filed on Apr. 29, 2015, the entire contents of which are incorporated herein by reference.

FIELD OF THE INVENTION

The present invention relates to a slipper (or sandal) capable of being worn bi-directionally, and more particularly to a slipper capable of being worn in both directions because the height of the front and rear of the slipper can be adjusted using a valve assembly capable of controlling the flow direction of a fluid.

BACKGROUND OF THE INVENTION

In general, a slipper or sandal has a simple structure, but has its front and rear directions determined. Accordingly, for example, in order to wear a slipper in the state in which a user has taken off the slipper when entering a home, the direction of the shipper must be changed. The slipper is chiefly used indoors. For example, if the slipper is used in an indoor bathroom, it is very inconvenient for a user to wear the slipper, taken off while exiting from the bathroom, when entering the bathroom again because the direction of the sipper must be changed.

In order to solve such inconvenience in use, there have been proposed various types of slippers capable of being used bidirectionally. Such proposals are merely a change of the direction of the instep strap of the slipper. The height of the bottom surface of the slipper has been determined depending on the front and rear directions of the slipper. In general, the height of the front has been designed to be low, whereas the height of the front has been designed to be high.

And in order to change the front and rear directions of the slipper and wear the slipper, the biggest problem is the height of the front and rear portions of the slipper. Although the direction of the instep strap of the slipper may be changed in various forms, a change in the height of the front and rear directions of the slipper itself is not so easy, and a detailed and realistic proposal therefor has not be found.

SUMMARY OF THE INVENTION

In order to change the direction of a slipper and wear the slipper as described above, the direction of the instep strap of the slipper must be changed and the height of the front and rear directions of the slipper must also be adjusted.

The present invention provides a slipper capable of being worn in both direction because the front and rear directions of the slipper can be changed by adjusting the height of the front and rear directions. According to the one aspect of the invention, a slipper includes, a body of the slipper having a first fluid storage casing and a second fluid storage casing embedded in a front portion and rear portion of the body respectively, each of the first fluid storage casing and second fluid storage casing having an elastic force; an instep strap of the slipper supported to the body being rotatable; a rotating shaft mounted in the body transversely, supported being rotatable in conjunction with the instep strap, and having an internal passage having a first and second check ball seating portions formed at both inner ends of a front and rear respectively; a first connecting portion and a second connecting portion for connecting the check ball seating portions to the first fluid storage casing and the second fluid storage casing, respectively; and a check ball embedded in the internal passage, having close contact to the check ball seating portion at a low position by a setting force when the internal passage is inclined by the rotation of the rotating shaft, and permitting a flow of a fluid in only one direction from the internal passage to the first connecting portion or the second connecting portion which is at high position. When the rotating shaft is inclined depending on a rotation angle of the instep strap, one of the fluid storage casing is expanded and the other fluid storage casing is contracted by the pressure applied on the both fluid storage casings and the one direction fluid flow, thereby adjusting a height of the front and rear of the slipper. According the another aspect, a slipper includes, a body of the slipper having a first fluid storage casing and a second fluid storage casing embedded in a front portion and rear portion of the body respectively, each of the first fluid storage casing and second fluid storage casing having an elastic force; a instep strap of the slipper supported to the body being rotatable; a rotating shaft mounted in the body transversely, supported being rotatable in conjunction with the instep strap, and having an internal passage having a first and second check ball seating portions formed at both inner ends of a front and rear respectively; a first connecting portion and a second connecting portion for connecting the check ball seating portions to the first fluid storage casing and the second fluid storage casing, respectively; and a check ball embedded in the internal passage, having close contact to the check ball seating portion at a high position by a buoyancy force when the internal passage is inclined by the rotation of the rotating shaft, and permitting a flow of a fluid in only one direction from the internal passage to the first connecting portion or the second connecting portion which is at a low position. When the rotating shaft is inclined depending on a rotation angle of the instep strap, one of the fluid storage casing is expanded and the other fluid storage casing is contracted by the pressure applied on the both fluid storage casings and the one direction fluid flow, thereby adjusting a height of the front and rear of the slipper.

In the slipper according to an embodiment of the present invention, the center rotating shaft is rotated and inclined by a movement of the instep strap, and thus the fluid within the body can be moved only in one direction. Accordingly, the direction of the slipper can be changed because the angle of the instep strap can be adjusted and thus the height of the front or rear of the body can be adjusted. For example, when a user wears the slipper indoors, the user can wear the slipper in the state of taken off in an opposite direction. Accordingly, there is an advantage in that the slipper can be worn in both directions.

DETAILED DESCRIPTION OF THE INVENTION

Figure 1:
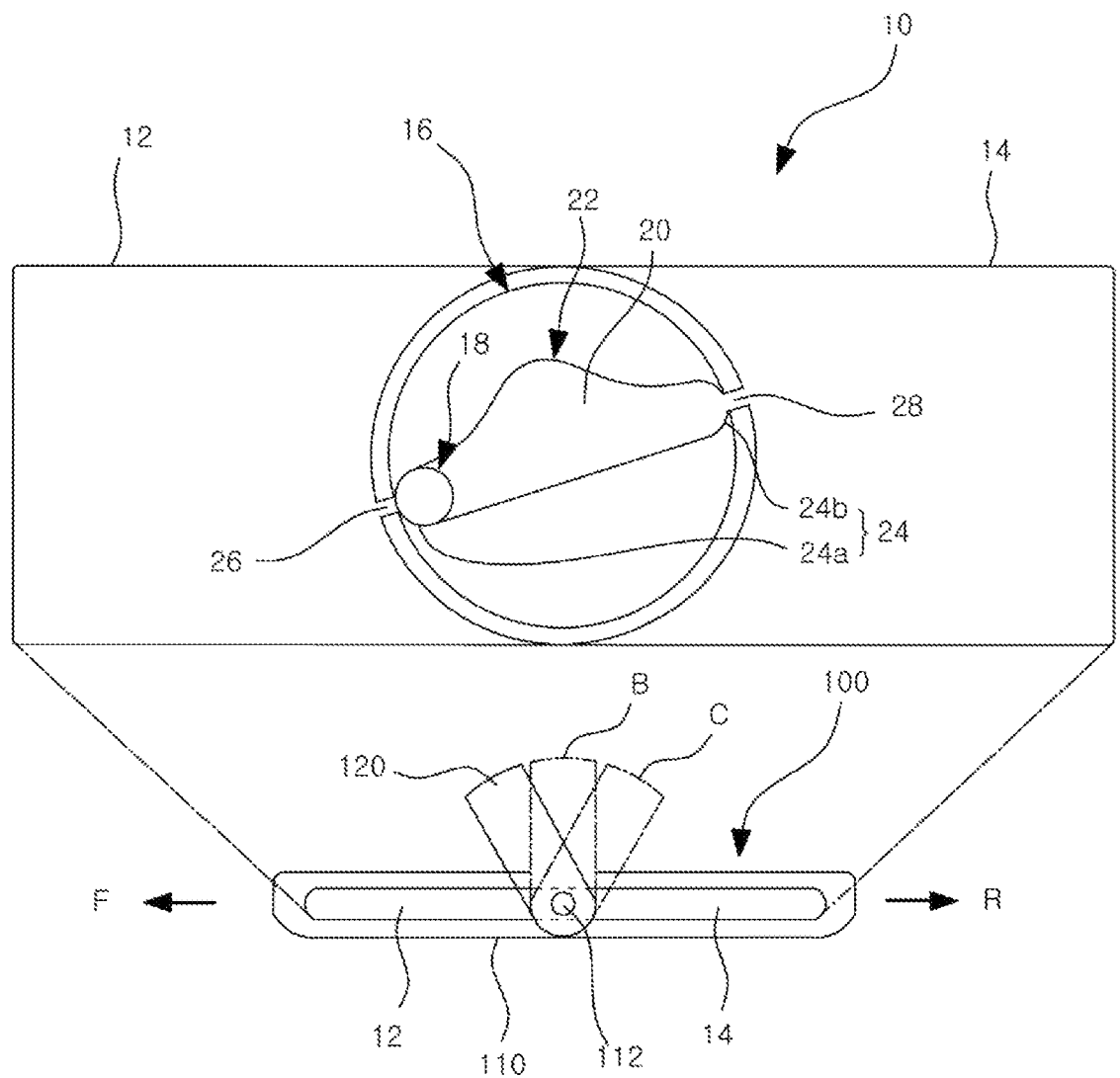
FIG. 1 is an exemplary sectional view showing an example of a slipper of the present invention.

Embodiments of the present invention are described in detail below with reference to the accompanying drawings. As shown in FIG. 1, a slipper 100 according to an embodiment of the present invention includes a valve assembly 10 capable of controlling the flow direction of a fluid. The valve assembly 10 has been designed so that the direction of the fluid within an internal passage 20 formed within a rotating shaft 16 is determined depending on the rotation angle of the rotating shaft 16.

The rotating shaft 16 which is mounted in a body 110 transversely has the internal passage 20 therein. The internal passage 20 may be inclined forward or backward by the rotation of the rotating shaft 16. A check ball 18 is included in the internal passage 20 of the rotating shaft 16. The check ball 18 determines the flow direction of the fluid within the internal passage 20 by a setting force or buoyancy. In this case, the rotating shaft 16 has been installed in left and right directions within the body 110, and the rotating shaft 16 is inclined in front and rear directions.

And the internal passage 20 is connected to a first fluid casing 12 and a second fluid casing 14 on the outside of the rotating shaft 16. Accordingly, the first fluid casing 12 and the second fluid casing 14 can supply the fluid or can be supplied with the fluid through the internal passage 20 with each other. More specifically, the first fluid casing 12 is connected to the internal passage 20 through a first connecting portion 26, and the second fluid casing 14 is connected to the internal passage 20 through a second connecting portion 28.

The fluid casings 12 and 14 may be made of a flexible material, and the connecting portions 26 and 28 may also be made of a flexible and extensible material. Furthermore, it is preferable that the fluid casings 12 and 14 may have an elastic restoring force. For example, the connecting portions 26 and 28 may be made of rubber or synthetic resin. And the connecting portions 26 and 28 may be designed to have a bellows form. That is, the connecting portions 26 and 28 may have a sufficient marginal length or flexibility capable of absorbing the rotation of the rotating shaft 16 which is rotatable.

The fluid can flow between the internal passage 20 and the fluid casings 12 and 14 via the first connecting portion 26 and the second connecting portion 28 formed on both ends of the internal passage 20. The check ball seating portions 24a and 24b are formed in the inner ends of internal passage 20 joining the respective connecting portions 26 and 28. The check ball seating portions 24 are formed to have a corresponding shape to ball 18. That is to say the check ball 18 can closely adhere to the ball seating portions 24 or the check ball 18 can have a close contact to any one of ball seating portions 24. For example, the check ball seating portion 24 may be formed to have a hemispherical concave portion or a partial concave and globular shape. The check ball seating portion 24 includes the first or front check ball seating portion 24a formed in the front F and the second or rear check ball seating portion 24b formed in the rear R, as shown in FIG. 1.

The check ball 18 may regulate a flow of the fluid in one direction only when it is seated in any one of the seating portions 24. And the check ball 18 is unable to regulate a flow of the fluid in the middle portion 22 of the internal passage 20. That is, as may be seen from FIGS. 2A and 3, the check ball 18 cannot regulate a flow of the fluid in the middle portion 22 of the internal passage 20 because the middle portion 22 has a diameter or cross section greater than that of the check ball 18. FIG. 3 shows the state in which the check ball 18 has been placed in the middle portion 22 of the internal passage 20 in a plan view. As may be seen from FIGS. 2 and 3, the check ball 18 cannot block a flow of the fluid because the middle portion 22 of the internal passage 20 has a greater width and height.

The height of the front and rear of the slipper can be adjusted because the valve assembly 10 configured as described above is applied to the slipper 100. As shown in FIG. 1, the slipper 100 includes the body 110 on which a foot of a user is placed and an instep strap 120 whose both ends are supported in the middle portion of the body 110 and which can be rotatable in clockwise or counterclockwise. Furthermore, the both ends of the instep strap 120 is connected to the both ends of rotating shaft 16. The first fluid casing 12 is installed in a portion of the body 110 corresponding to the front F of the slipper, and the second fluid casing 14 is installed within a portion of the body 110 corresponding to the rear R of the slipper.

And the rotating shaft 16 is installed in the body 110 between the first fluid casing 12 and the second fluid casing 14. The rotating shaft 16 may be installed to operate in conjunction with the instep strap 120 of the slipper 100, for example, to operate in conjunction with the support shaft 112 of the instep strap 120. Furthermore, as shown by a solid short line in FIG. 1, when the instep strap 120 is forward rotated at an angle, the valve assembly 10 becomes the state shown in FIG. 1. At this time, the rotating shaft 16 has been rotated at the same angle in a counterclockwise direction that is the same direction as the instep strap 120.

The front portion of the internal passage 20 becomes low in the state in which the rotating shaft 16 has been rotated counterclockwise and inclined at an angle as shown in FIG. 1. Accordingly, the check ball 18 is seated in the first check ball seating portion 24a in front of the first connecting portion 26 because it sinks down by a setting force. In the stated shown in FIG. 1, the check ball 18 has a close contact to the first check ball seating portion 24a, to the extent that the fluid cannot flow from the internal passage 20 to the first connecting portion 26. Also in this state, since the check ball 18 blocks the passage to the first connecting portion 26, a flow of the fluid from the internal passage 20 to the first connecting portion 26 is prevented. That is, in this state, a flow of the fluid from the second fluid casing 14 to the first fluid casing 12 cannot be allowed.

However, when the fluid flows from the first fluid casing 12 to the internal passage 20 through the first connecting portion 26, the check ball 18 cannot prevent the flow of the fluid. Accordingly, the fluid in the first fluid casing 12 becomes the state in which the fluid can enter the second fluid casing 14 through the internal passage 20. That is, the fluid can move from the first fluid casing 12 in front of the body 110 of the slipper 100 to the second fluid casing 14 in the rear of the body 110 in the state in which the instep strap 120 of the slipper 100 has been rotated at an angle to the front direction as indicated by the solid line in FIG. 1.

That is, when a user wears the slipper 100 in the state in which the front of the slipper 100 is forward in FIG. 1, the instep strap 120 is inclined to the left at a specific angle as indicated by the solid line in FIG. 1. Furthermore, in this state, since the check ball 18 has a close contact to the first check ball seating portion 24a in the front F, flow of the fluid from the first fluid casing 12 to the second fluid casing 14 can be formed, but flow of the fluid from the second fluid casing 14 to the first fluid casing 12 is not allowed.

The top side of foot inclines high rearward, generally. Thus when a user wears the slipper, the instep strap 120 is directed toward, that is to say the instep strap 120 rotates counterclockwise as shown in FIG. 1 with solid line. As a result, the fluid can move from the first fluid casing 12 to the second fluid casing 14, by the pressure applied to the first fluid casing 12. That is to say, when the user presses the front portion of the body 110 of the slipper 100 with his or her sole, the fluid can move from the first fluid casing 12 to the second fluid casing 14. Accordingly, the height of the second fluid casing 14 in the rear is increased by the fluid moved from the first fluid casing 12 to the second fluid casing 14 as described above. As a result, the height of the rear portion of the body 110 of the slipper 100 will be increased, and the height of the front portion of the body 110 of the slipper 100 will be decreased.

In this case, an operation of pressing, by the foot of the user, the front portion of the body 110 of the slipper 100 may be the same as an operation of pressing, by the foot the first fluid casing 12. Such an operation can be sufficiently performed in a process of wearing the slipper in addition to when the user is walking. When any one of the first fluid casing 12 and the second fluid casing 14 is pressurized by such an operation of the user, one of the first fluid casing and the second fluid casing can be expanded and the other of the first fluid casing and the second fluid casing can be contracted by a movement of the fluid through the internal passage 20, thereby being capable of adjusting the height of the front and rear of the slipper.

Figure 2A:
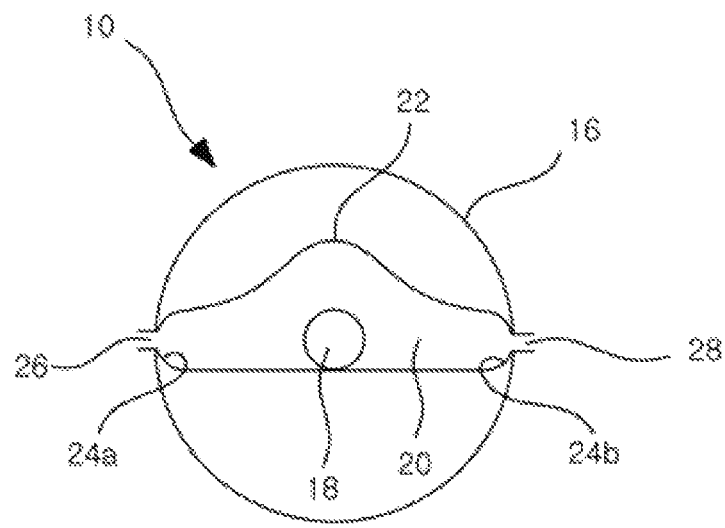
FIGS. 2A and 2B are exemplary sectional views showing the flow direction of a fluid based on a rotation angle within the valve assembly.
Figure 2B:
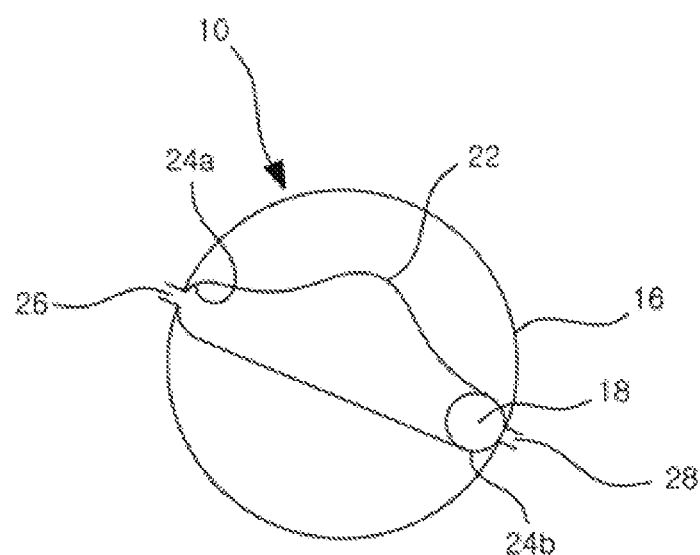
Figure 3:
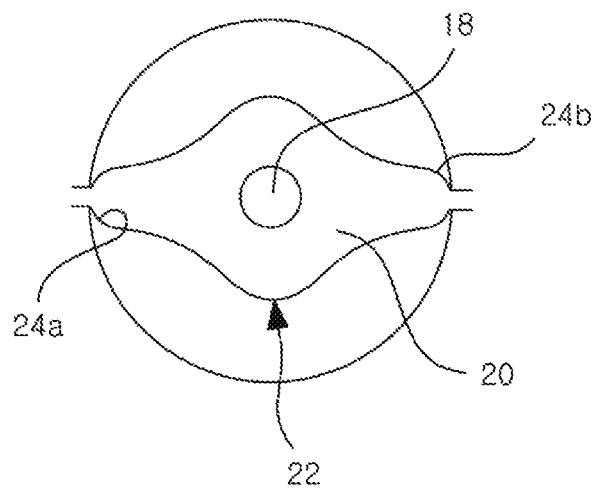
FIG. 3 is an exemplary plan view of the valve assembly of the invention.

Furthermore, in the state in which the instep strap 120 stands upright as indicated by B in FIG. 1, the valve assembly 10 becomes the state shown in FIG. 2A. This may be said to be a neutral state that is not the state in which the user has not worn the slipper. The state shown in FIG. 2B is opposite the state shown in FIG. 1. This may be said to be the state in which the instep strap 120 of the slipper 100 becomes the state indicated by C in FIG. 1. In this state, the user has worn the slipper in an opposite direction, that is, the user has worn the rear R of the slipper 100 forward.

In this state, when the instep strap 120 becomes the state indicated by C in FIG. 1, the rotating shaft 16 is clockwise rotated in a specific section, thus becoming the state shown in FIG. 2B. In this state, the check ball 18 sinks down and closely adheres or contacts to the second check ball seating portion 24b in the rear, which neighbors the second connecting portion 28. Accordingly, in this state, the fluid can move from the second fluid casing 14 to the first fluid casing 12, but a flow of the fluid in an opposite direction is not permitted.

And in this state, the user has worn the slipper 100 in a reverse direction, and thus the instep strap 120 has been inclined toward the rear R. In this state, the fluid can move from the second fluid casing 14 to the first fluid casing 12 within the body 110 of the slipper 100 as described above. Accordingly, the fluid can flow from the second fluid casing 14 to the first fluid casing 12 in the front F by a force generated by the sole of the user pressing the second fluid casing 14, thereby raising the body of the front portion up.

In accordance with the first embodiment described above, an example in which the check ball 18 of the valve assembly 10 has a setting force has been described. That is to say, the check ball 19 sinks in the fluid, since the check ball 18 may be made of metal having greater specific gravity than the fluid. In a second embodiment of the present invention to be described below, it is assume that the check ball 18 is made of a material having buoyancy, that is, a material having smaller specific gravity than a fluid.

Figure 4:
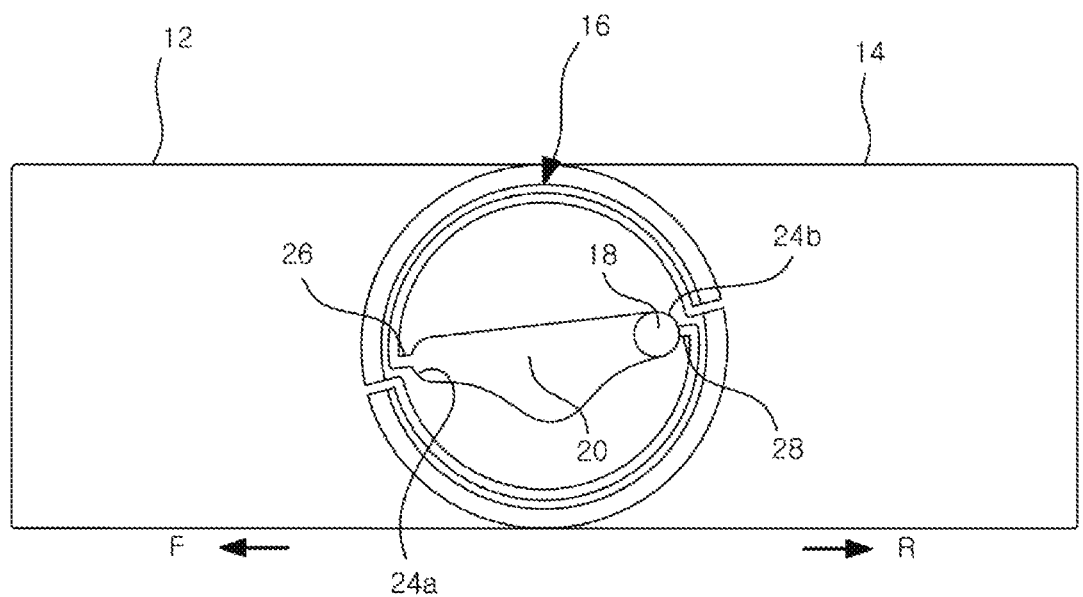
FIG. 4 is an exemplary sectional view showing another example of slipper of the present invention.

In a description of the second embodiment, the same elements as those of the first embodiment are assigned the same reference numerals as those of the first embodiment. FIG. 4 shows the state in which a user has worn the slipper 100 using the front F as a forward direction in the same state as the state of the slipper 100 shown in FIG. 1. In this state, since the check ball 18 has buoyancy and float in the fluid, it blocks the second check ball seating portion 24b connected to the second connecting portion 28.

Accordingly, in this state, the fluid cannot exit from the internal passage 20 through the second connecting portion 28. On the contrary to this, the fluid can enter into the internal passage 20 through the second connecting portion 28. The embodiment is different from the first embodiment in that the second connecting portion 28 is connected to the first fluid casing 12 and the first fluid connecting portion 26 is connected to the second fluid casing 14. That is, the present embodiment is different from the first embodiment in that the check ball 18 is made of a material having buoyancy with respect to a fluid and the first connecting portion 26 and the second connecting portion 28 are connected to different fluid casings. Furthermore, a substantial operation is the same as that of the first embodiment.

As described above, in accordance with the present invention, when the valve assembly 10 is applied to the slipper 100, the flow direction of a fluid can be controlled depending on the rotating direction of the instep strap of the slipper 100. If the valve assembly 10 according an embodiment of the present invention is applied to the slipper, the height of the front or rear of the body 110 can be adjusted so that a user can wear the slipper in both directions.

As described above, it is evident that those skilled in the art may change and modify the present invention in various ways without departing from the technical spirit of the present invention and the scope of the present invention should be interpreted based on the appended claims and their equivalents.

What is claimed is:

1. A shoe in form of a slipper or a sandal, the shoe comprising:
    a body having a first fluid storage casing and a second fluid storage casing enclosed in a front portion and a rear portion of the body, respectively, each of the first fluid storage casing and second fluid storage casing having an elastic property;
    an instep strap rotatably supported onto the body;
    a rotating shaft mounted to the body in a manner being rotatable in conjunction with the instep strap, and having an internal passage with first and second check ball seating surfaces formed at two opposite inner ends of the internal passage;
    the rotating shaft having a first connecting portion and a second connecting portion for connecting the first and second check ball seating surfaces to the first and second fluid storage casings, respectively; and
    a check ball enclosed in the internal passage of the rotating shaft, the check ball being moveable to contact closely to a lower positioned one of the check ball seating surfaces by gravitational force when the internal passage is inclined by rotation of the rotating shaft, and permitting a fluid flow in only one direction from the internal passage to one of the first and second connecting portions of the rotating shaft which is at a higher position;
    wherein when the rotating shaft is inclined in accordance with a rotation angle of the instep strap, one of the fluid storage casing is expanded and the other fluid storage casing is contracted by pressure applied on the fluid storage casings due to the one direction fluid flow, thereby capable of adjusting a height of the front and rear portions of the body.

2. A shoe in form of a slipper or a sandal, the shoe comprising:
- a body having a first fluid storage casing and a second fluid storage casing enclosed in a front portion and a rear portion of the body, respectively, each of the first fluid storage casing and second fluid storage casing having an elastic property;
- an instep strap rotatably supported onto the body;
- a rotating shaft mounted to the body in a manner being rotatable in conjunction with the instep strap, and having an internal passage with a first and second check ball seating surfaces formed at two opposite inner ends of the internal passage;
- the rotating shaft having a first connecting portion and a second connecting portion for connecting the first and second check ball seating surfaces to the first and second fluid storage casings, respectively; and
- a check ball enclosed in the internal passage of the rotating shaft, the check ball being moveable to close contact to a higher positioned one of the check ball seating surfaces by a buoyancy force when the internal passage is inclined by rotation of the rotating shaft, and permitting a fluid flow in only one direction from the internal passage to one of the first and second connecting portions of the rotating shaft which is at a lower position;

wherein when the rotating shaft is inclined in accordance with a rotation angle of the instep strap, one of the fluid storage casing is expanded and the other fluid storage casing is contracted by pressure applied on the fluid storage casings due to the one direction fluid flow, thereby capable of adjusting a height of the front and rear portions of the body.

* * * * *